(12) United States Patent
Stucki

(10) Patent No.: US 9,090,344 B2
(45) Date of Patent: Jul. 28, 2015

(54) ROTOR BLADE COUPLING DEVICE AND ROTOR HEAD

(75) Inventor: Martin Stucki, Pfäffikon (CH)

(73) Assignee: MARENCO SWISSHELICOPTER AG, Mollis (CH)

( * ) Notice: Subject to any disclaimer, the term of this patent is extended or adjusted under 35 U.S.C. 154(b) by 675 days.

(21) Appl. No.: 13/405,649

(22) Filed: Feb. 27, 2012

(65) Prior Publication Data
US 2012/0219422 A1 Aug. 30, 2012

(30) Foreign Application Priority Data

Feb. 28, 2011 (CH) .................................... 0347/11

(51) Int. Cl.
*B64C 27/48* (2006.01)
*B64C 27/35* (2006.01)

(52) U.S. Cl.
CPC ................. *B64C 27/48* (2013.01); *B64C 27/35* (2013.01)

(58) Field of Classification Search
CPC .......... B64C 27/35; B64C 27/33; B64C 27/48
USPC ...... 416/131, 132 R, 134 R, 134 A, 135, 136, 416/140, 204 R, 205, 210 A, 210 R
See application file for complete search history.

(56) References Cited

U.S. PATENT DOCUMENTS

| 4,135,856 A | 1/1979 | McGuire |
| 4,257,739 A * | 3/1981 | Covington et al. ....... 416/134 A |
| 4,666,372 A | 5/1987 | Avila et al. |
| 6,004,099 A | 12/1999 | Bansemir et al. |

FOREIGN PATENT DOCUMENTS

| DE | 19620427 C1 | 6/1997 |
| GB | 2116506 | 9/1983 |
| GB | 2165026 A | 4/1986 |

OTHER PUBLICATIONS

European Search Report dated Apr. 2, 2015 for European Application No. 12156784.6.

\* cited by examiner

*Primary Examiner* — Edward Look
*Assistant Examiner* — Juan G Flores
(74) *Attorney, Agent, or Firm* — Paul D. Bianco; Martin Fleit; Fleit Gibbons Gutman Bongini & Bianco PL

(57) ABSTRACT

A rotor blade coupling device (9) comprising a torsionally rigid carrier (4) is disclosed, the carrier (4) being mounted in a manner which is free of centrifugal force between a thrust bearing (3) and a control bearing (5), resilient impact and pivoting movements of the rotor blade coupling device (9) being able to take place in a damped manner. The rotor blade coupling device (9) is clamped between a rotor head star (101) and a rotor head central piece (102) and held rotatably about the rotor axis A. The centrifugal forces which occur, are transmitted from a rotor blade holder (2) to the rotor head star (101) and thus kept away from the carrier (4).

11 Claims, 5 Drawing Sheets

ROTOR BLADE COUPLING DEVICE AND ROTOR HEAD

TECHNICAL FIELD

The present invention discloses a rotor blade coupling device comprising a carrier and a rotor blade holder fastened thereto for receiving at least one rotor blade.

PRIOR ART

Non-articulated rotor heads for rotorcraft, for example helicopters, have been known for many years. A plurality of rotor blades producing elevation are fastened in each case to a torque transmission element on a rotor mast comprising a rotor axis, via one respective rotor blade coupling device. The rotor head transmits a torque to the rotor blades via the rotor blade coupling device.

In the prior art, a so-called "flexbeam" is used as part of the rotor blade coupling device. Said flexbeam is designed to be flexible and torsionally resilient, whereby the impact movements and pivoting movements of the rotor blades occurring during the rotation are able to be damped. In this case, the pivoting movements occur in the rotational plane of the rotor blades and the impact movements accordingly occur in a plane perpendicular to the rotational plane of the rotor blades.

The "flexbeam" is connected, on the one hand, indirectly to the rotor head and, on the other hand, to the rotor blade and enables the rotor blade to carry out impact movements and pivoting movements, said movements being able to be achieved by flexible portions and being damped by damping elements.

A rotor blade coupling device comprising a "flexbeam" is revealed in GB 2165026, said rotor blade coupling device being able to absorb and withstand bending and shear forces which are present, as well as centrifugal force during operation of the rotor. Said "flexbeam" is formed by a flexurally rigid beam which is partially surrounded by elastomeric material along the length and is completely surrounded by a torsionally resilient sleeve. A highly torsionally resistant bolt traverses the interior of the enclosed beam between connecting elements arranged on both sides, which are used for fastening to the rotor head and/or to the rotor blade. Thus a rotor blade coupling device which has the desired torsional and bending properties is achieved, in order, on the one hand, to permit the adjustment of the blade pitch about the rotor blade longitudinal axis and, on the other hand, to damp the pivoting and impact movements which occur.

The flexbeam, however, requires a plurality of components and therewith a complex component which accordingly has to be assembled in a complex manner in a plurality of steps. If, for example, a greater torsional rigidity is required, the entire flexbeam has to be disassembled in order to remove the bolt from the interior of the beam surrounding the sleeve. After replacing the bolt, the flexbeam has to be reassembled in a stepwise manner. The combination of the different properties of the components of the flexbeam leads to the desired resilient properties. The complex multi-part flexbeam thus has to be completely disassembled, if one of the properties is to be altered. The plurality of individual parts then has to be reassembled by being precisely adjusted relative to one another.

In DE 19620427 a flexbeam or supporting beam constructed in a simple manner is disclosed as a rotor blade coupling device, which is able to transmit centrifugal forces, transverse forces and bending moments and torsional moments from the rotor blades to the rotor head, a virtual impact and pivoting joint being formed which permits an adjustment of the blade pitch about the rotor blade longitudinal axis.

The flexbeam has different portions which have variable flexural rigidity. To achieve the different flexible properties, slots are arranged in the body of the flexbeam, which are partially filled with elastomeric layers. Also in this case, therefore, a multi-part flexbeam is provided which by the specific introduction of slots and the unreleasable fastening of elastomeric layers within the slots forms a resulting complex component, which has the desired resilient properties.

In order to adapt the pivoting and impact movement properties during the operation of the rotor, the entire flexbeam has to be replaced. To adapt the damping properties, the shape of the flexbeam is not able to be easily altered. Also, the damping elements are not easily able to be replaced as, due to the high loads on the rotor blade coupling device, said damping elements have to be unreleasably connected to the flexbeam body.

The flexbeams known from the prior art are thus configured in a complex manner, whereby the required flexibility may be achieved. Moreover, the flexbeams are also designed to be stable, such that the centrifugal forces acting on the rotor blade coupling device during the rotation of the rotor blades may be at least partially absorbed.

DESCRIPTION OF THE INVENTION

The object of the present invention is to provide a rotor blade coupling device which may be easily adjusted, which may be replaced or varied easily, easy adjustment of the resilient properties being possible.

A further object of the present invention is to keep the direct action of the centrifugal forces away from the resilient damping portions and the carrier itself. The components no longer need to be designed to be stable and are protected during operation. Moreover, improved fine tuning of the flexibility and/or rigidity of the carrier and the damping portions is possible.

By means of the disclosed design of the rotor blade coupling device an improved transmission of the blade pitch control is possible almost immediately, as a flexbeam which is torsionally resilient is dispensed with. In the solution according to the invention, the control input for the rotor blade is directly forwarded into a torsionally rigid carrier, which transmits the control commands to the corresponding rotor blade holder. The rotor blade coupling device is configured to be torsionally rigid per se.

BRIEF DESCRIPTION OF THE DRAWINGS

A preferred exemplary embodiment of the subject of the invention is disclosed hereinafter, in combination with the accompanying drawings.

FIG. 1b shows a section through a rotor head along the cutting line A-A according to FIG. 1a.

FIG. 2b shows a plan view of the rotor head according to FIG. 2a.

DESCRIPTION

Figure 1A:
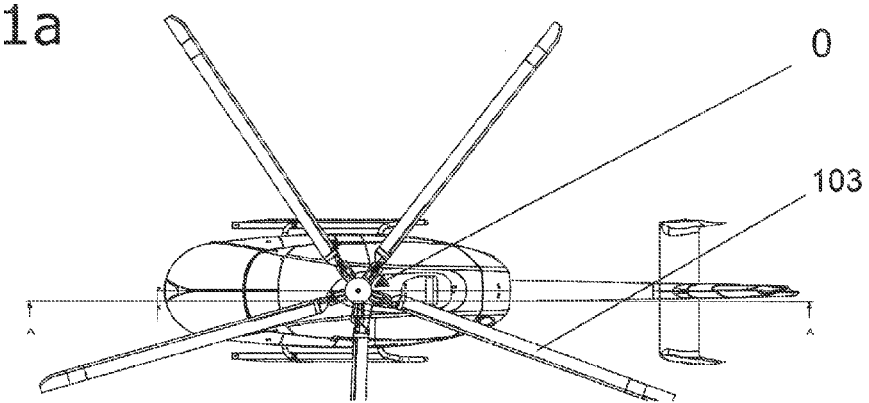
FIG. 1a shows a plan view of a helicopter, whilst
Figure 1B:
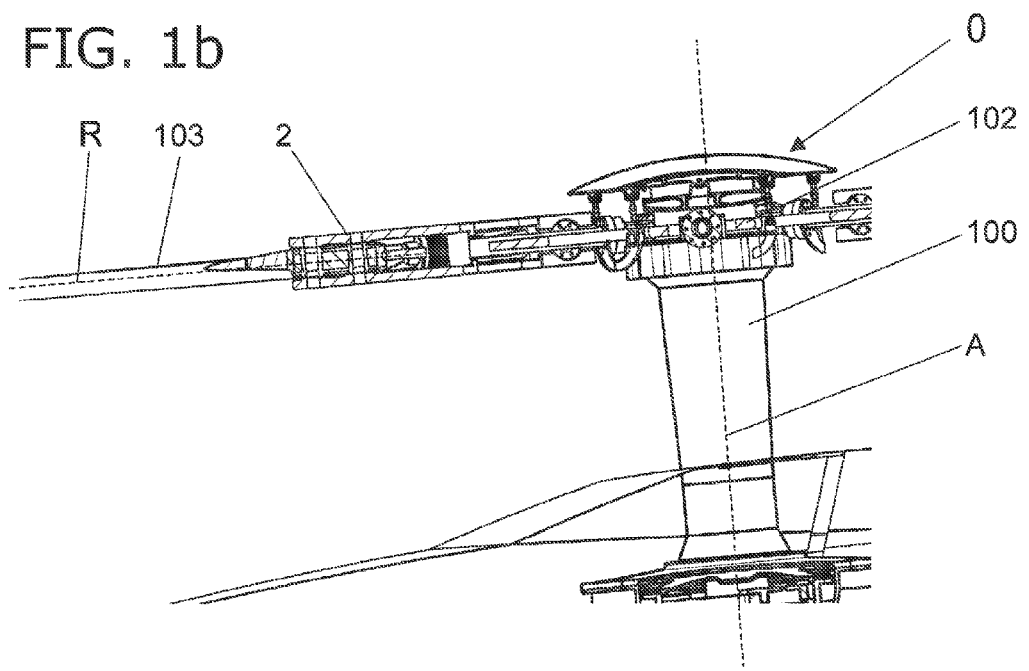

In the plan view according to FIG. 1a of a helicopter a rotor head 0 may be seen, on which a plurality of rotor blades 103 is arranged, in a manner in which they may be releasably fastened.

The rotor head 0 is fastened to a rotor mast 100, so that a rotation may be performed about a rotor axis A. Each rotor blade 103 is fastened to one respective rotor blade holder 2 and thus is able to be rotated with the rotor head 0 about the rotor axis A and pivotably mounted about a rotor blade longitudinal axis R. A torque transmission unit 1 which comprises a rotor head central piece 102, provides the torque transmission from the rotor mast 100 to the individual rotor blades 103. In this case, a rotor head 0 is shown by way of example, with five rotor blades 103 which are fixed by being releasably connected positively and/or non-positively in each rotor blade holder 2, so that centrifugal forces of up to a few hundred thousand Newtons are able to act safely on each rotor blade 103.

Figure 2A:
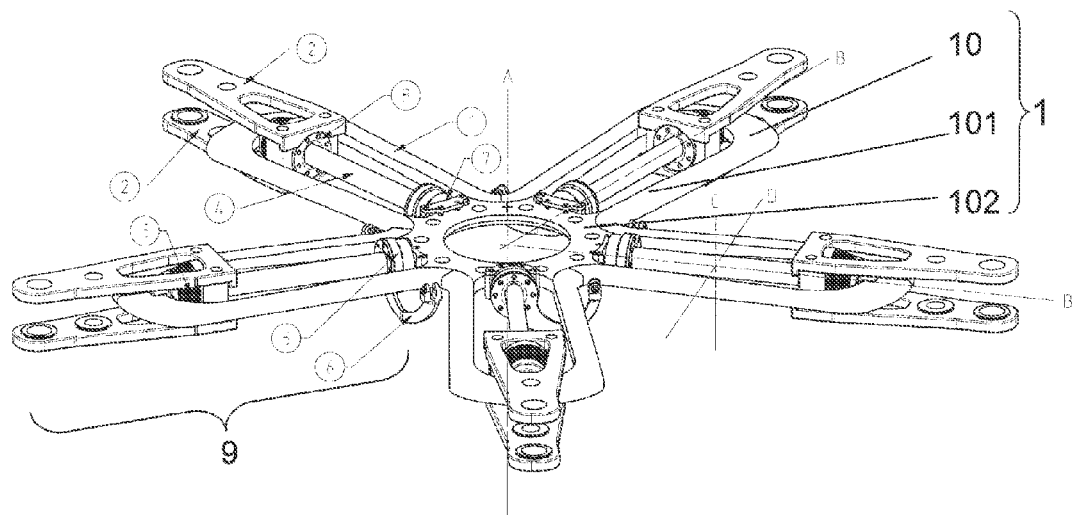
FIG. 2a shows a perspective view of a rotor head with a total of five rotor blade holders with the rotor blades omitted, whilst

As illustrated in FIG. 2a, the torque transmission unit 1 comprises a rotor head star 101 which is fastened to the rotor head central piece 102 and is connected fixedly in terms of rotation to the rotor mast 100. The rotor head star 101 is shaped in the manner of a loop and holds a plurality of rotor blade coupling devices 9. The rotor blade coupling devices 9, in each case running between a tapered region 10 of the rotor head star 101 and the rotor head central piece 102, are arranged to be releasably fastened between the arms of the rotor head star of loop-like design. Each bearing housing 7 arranged on the rotor head central piece 102 receives a rotor blade coupling device 9. The bearing housing 7 is fastened to the rotor head central piece 102 by connecting means, for example by screws.

The rotor blade coupling device 9 comprises a control bearing 5, a carrier 4, a thrust bearing 3 and a rotor blade holder 2. By means of the rotor blade coupling device 9, the rotor blades 103 are able to be pivoted about the rotor blade longitudinal axis R which coincides with the carrier longitudinal axis B. For reasons of clarity, the rotor blades 103 are omitted in FIGS. 2 to 5.

Figure 2B:
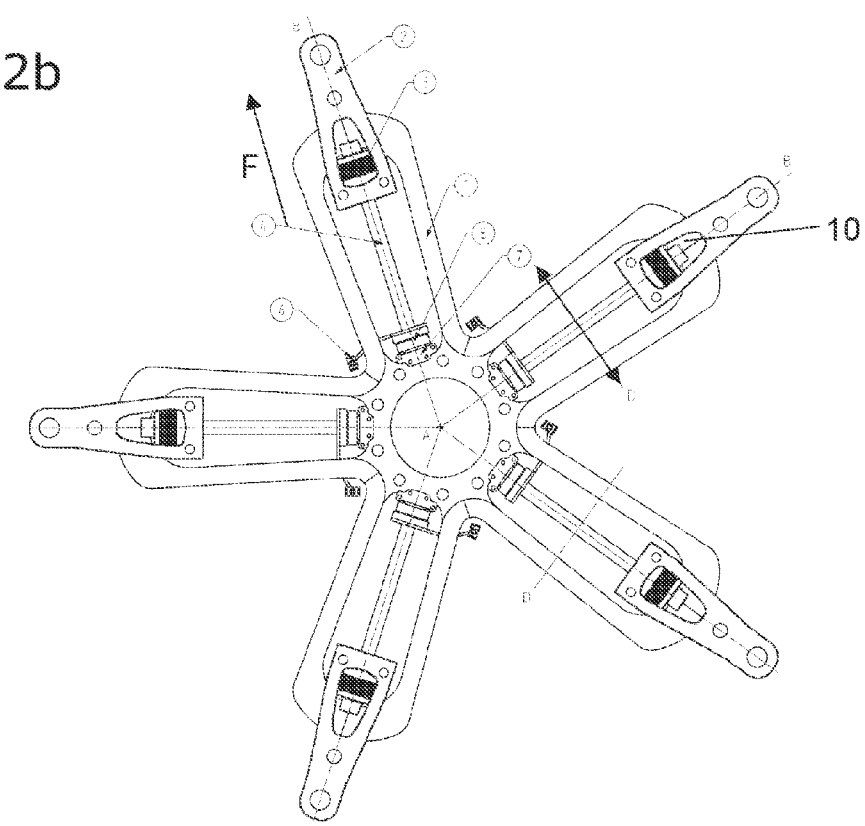

The direction of movement of the rotor blades 103 in the impact direction C is indicated in FIG. 2a and in the pivoting direction D in FIG. 2b. Movements in these directions are resiliently damped by the rotor blade coupling devices 9.

The rotor blade holder 2 is connected non-positively and/or positively to the rotor blade star 1 via the thrust bearing 3, which is configured as a spherical bearing. The rotor blade holder 2 is connected fixedly in terms of rotation to the carrier 4 via a flange 8 on the blade holder side and is connected fixedly in terms of rotation to the thrust bearing 3. The centrifugal forces F acting on the rotor blade holder 2 during operation may, as a result, be conducted from the rotor blade holder 2 via the thrust bearing 3 into the rotor head star 1. The rotor blade coupling device 9 thus transmits the centrifugal force into the rotor head star 1.

By means of a control arm 6, the blade pitch may be controlled by pivoting about the rotor blade longitudinal axis R, in this case the carrier 4 and thus the entire rotor blade coupling device 9 are rotated in a torsionally rigid manner about the carrier longitudinal axis B.

Figure 3:
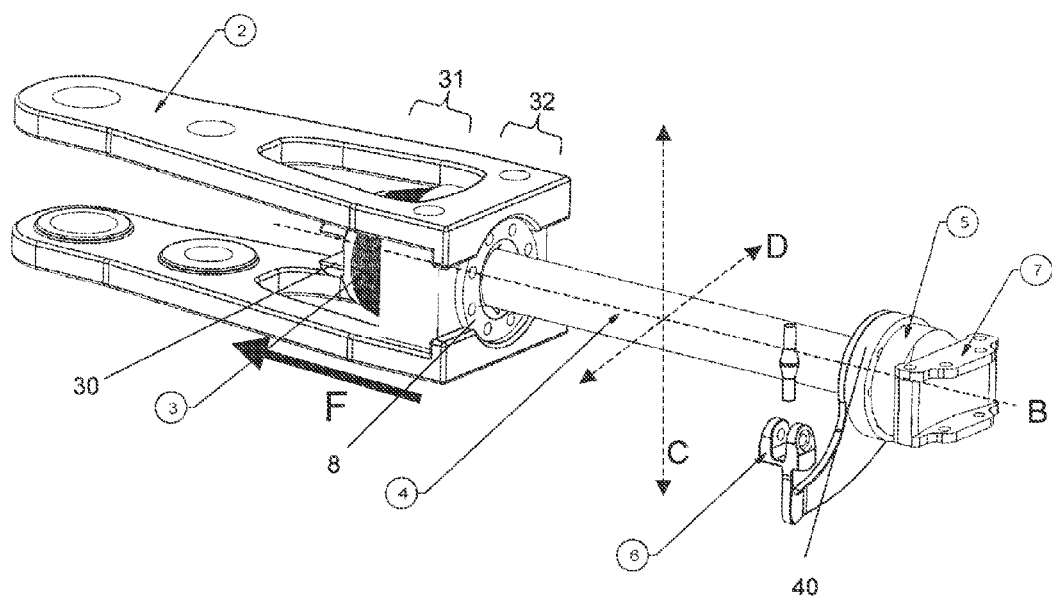
FIG. 3 shows a perspective view of a rotor blade holder with a rigid holder, whilst
Figure 4:
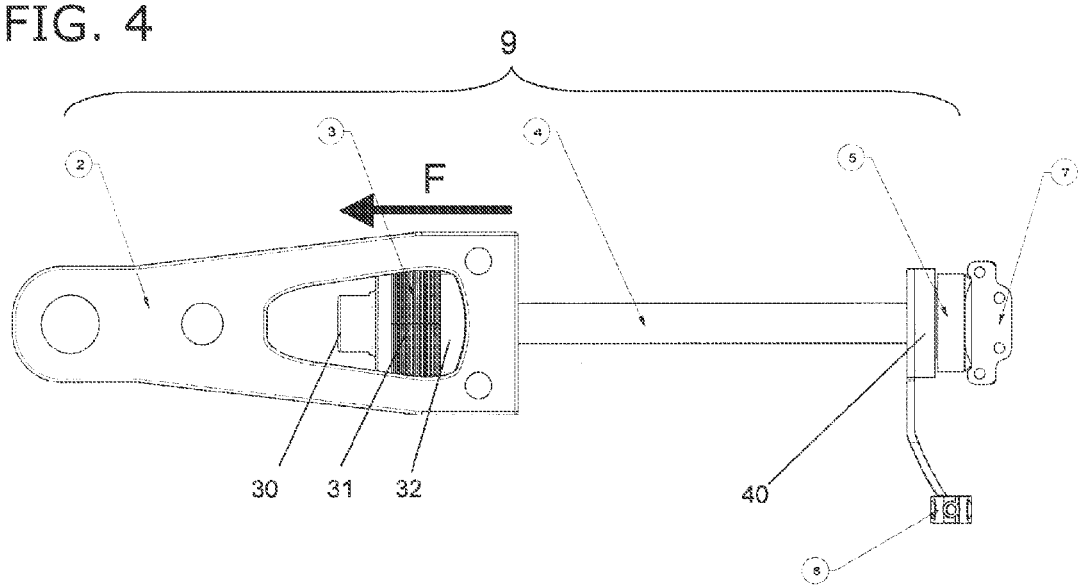
FIG. 4 shows a plan view of the rotor blade holder with the rigid carrier according to FIG. 3

In FIG. 3, a perspective view of the rotor blade coupling device 9 is shown. The bearing housing 7 fixed to the rotor head central piece 102 receives the control bearing 5. Said control bearing 5 is in this case configured as a spherical bearing. A flange 40 arranged on the carrier 4 on the rotor axis side is movably mounted in the control bearing 5. Thus the carrier 4 is movable in terms of pivotability and impact, and rotatably mounted on the rotor head central piece 102. The carrier 4 is configured to be tubular and torsionally rigid, the carrier 4 being designed to be resilient in the impact direction C and the pivoting direction D. The resilience may be varied by a suitable choice of material and the geometric design of the carrier 4. The carrier 4 is connected fixedly in terms of rotation to the flange 8 on the blade holder side. The carrier 4 is connected to the thrust bearing 3 via the flange 8 on the blade holder side.

The thrust bearing 3 comprises a transmission element receiving portion 30, a flexible portion 31 and a fastening portion 32. The transmission element receiving portion 30 receives the tapered region 10 of the rotor head star 101. The flexible portion 31 comprises a resilient damping portion with a plurality of elastomeric layers and metal layers, which permit a resilient deflection of the thrust bearing 3 in the pivoting and impact directions.

As a result, the rotor blade coupling device 9 and thus the rotor blade holder 2 as well as the rotor blades 103 coupled thereto perform impact and pivoting movements. The rotor blade holder 2 is connected non-positively and/or positively to the fastening portion 32 by means of a flange 8 on the blade holder side.

Figure 5:
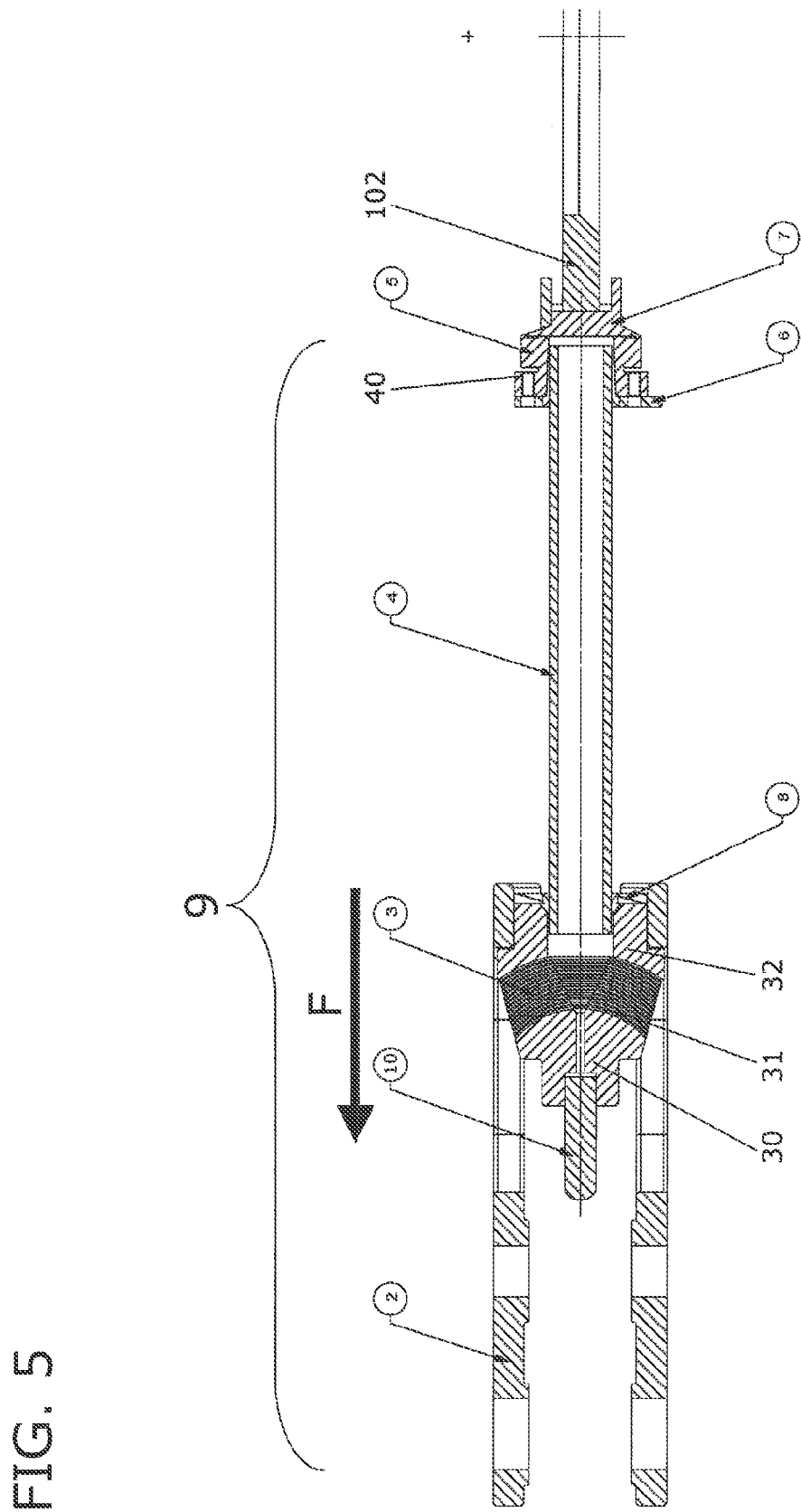
FIG. 5 shows a section through the rotor blade holder with the rigid carrier.

FIG. 5 shows a section through a rotor blade coupling device 9 which is clamped between the tapered region 10 of the rotor head star 101 and the bearing housing 7 on the rotor head central piece 102. The carrier 4 is a cylindrical tubular portion which is designed to be torsionally rigid and which transmits control inputs to the rotor blade holder 2 via the carrier longitudinal axis B. The carrier 4 has an axial sliding seat in the spherically designed control bearing 5, in order counter the shortening of the carrier 4 in the carrier longitudinal axis B caused by the impact and pivoting movements.

The rigidity in the impact and pivoting directions C, D of the carrier 4 may be individually adjusted, by geometric dimensions and suitable materials with the desired resilient properties being used.

By the shape and choice of material of the carrier 4, the rigidity in the two axes C, D may be adjusted independently of one another, the material not being loaded in the direction of the carrier longitudinal axis B, due to the mounting which is free of centrifugal force, so that different options exist.

The carrier 4 is made substantially from fibre composite materials or a different suitable material and forms a stiff, torsionally rigid structural element which is movable in terms of impact and pivotability over the entire length of the carrier 4. The control bearing 5 absorbs small movements of the carrier 4 in the impact direction C and the pivoting direction D, as the majority of the deflections are absorbed by the thrust bearing 3.

The carrier 4 is thus mounted on the rotor mast side in the control bearing 5 and on the rotor blade side in the thrust bearing 3, by being supported in a self-supporting manner. During the rotation, centrifugal forces are kept away from the carrier 4 and transmitted via the rotor blade holder 2 to the rotor head star 101. The carrier 4 is designed to be torsionally rigid and the pivoting about the carrier longitudinal axis B is performed by pivoting the entire carrier 4. By the deflection of the control arm 6, the carrier 4 is pivoted about the carrier longitudinal axis B.

As centrifugal forces do not act on the carrier 4, only the flexible properties have to be taken into account when manufacturing the carrier 4 and adapted to the specifications.

The rotor head star 101 is designed to be rigid in the pivoting direction D and transmits, on the one hand, the driving moment from the rotor head 0 to the rotor blade 103 and, on the other hand, the rotor blade centrifugal forces F acting on the rotor head central piece 102 during operation of the rotor.

So that the rotor head star 101 may be made separately, a spacing is generally incorporated between the rotor head star 101 and the rotor head central piece 102 of the rotor head 0. The loop-like rotor head star 101 is then connected non-positively and/or positively to the rotor head central piece 102.

As the centrifugal force does not act directly on the carrier 4 and/or on the spherical thrust bearing 3, it is possible to adjust the rigidity of the individual axes separately from one another. The rotor head 0 according to the invention may, in principle, be designed both with a high degree and a low degree of pivoting stiffness, the impact and pivoting stiffness being able to be structurally preset, virtually independently of one another.

By means of the carrier 4 according to the invention, it is also possible to control the entire activation of the rotor blade 103 in a manner which is free of centrifugal force, i.e. not loaded by very high centrifugal forces acting on the rotor blades 103 when the rotor is in operation, and to adapt the rotor head 0 by means of the corresponding spring constants, to the necessary requirements. This advantageous effect is, in particular, very easy to achieve with multi-blade rotors.

The rotor head star 1 is configured in the rotational plane of the rotor blades 103 with the tapered region 10. In addition to absorbing the impact movement by the resilient rotor blade coupling device 9, the rotor head star 1 is also able to absorb resilient deflections in the tapered region 10. Thus the impact joint and pivot joint stiffness of the entire rotor head 0 may be adjusted, on the one hand, by varying the resilience of the rotor blade coupling device 9 and/or of the carrier 4 and, on the other hand, by varying the resilience of the rotor head star 1. The rotor head star 1 which may be made of fibre composite materials and also of metal alloys, is of rigid configuration in the pivoting direction.

By means of the shape and choice of material of the flexible portions 31 and the control bearing 5, the rigidity may be adjusted in the impact direction and the pivoting direction independently of one another.

By means of the arrangement of the control bearing 5 outside the impact and pivot joints, undesirable "cross coupling" of the blade forces and movements during impact and pivoting movements of the rotor blades 103 may be avoided. The majority of the impact and pivoting forces occur in the region of the thrust bearing 3.

By the loop-like design of the rotor head star 101 and the mounting of the rotor blade coupling device 9 enclosing the thrust bearing 3, a low overall height of the clamped rotor blade coupling device 9 and/or the entire rotor head 0 may be achieved. The resilient bending properties of the rotor head star 101 influence the flexural resilience of the rotor blade coupling device 9.

Tests have shown that the torsional rigidity of the carrier 4 may be dimensioned such that by minimal deformation of the carrier 4 the blade control is not able to be negatively affected. Thus a torsional rigidity of the carrier 4 in the range of 1500 to 4000 Nm/rad has proved to be appropriate. A carrier 4 designed to be torsionally rigid, therefore, is understood to be a carrier 4 with a torsional rigidity in the above described range.

Figure 6A:
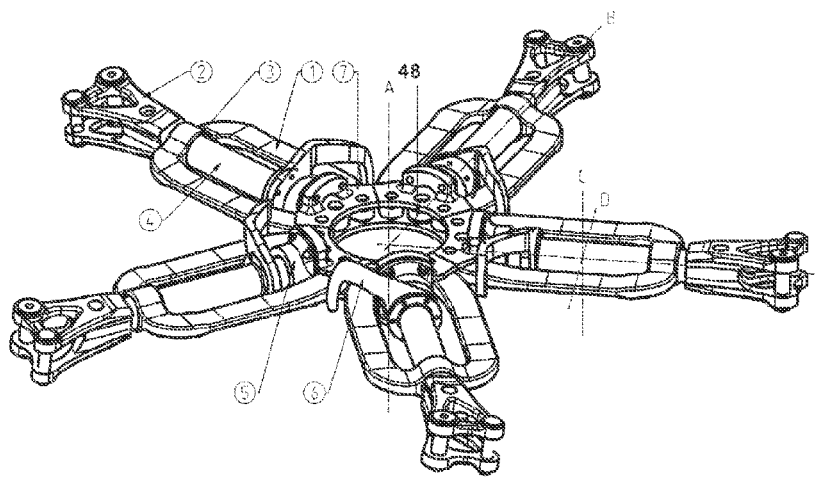
FIG. 6a shows a perspective view of a modified rotor head with a total of five rotor blade holders, whilst

A modified rotor head with a total of five slightly modified rotor blade holders is shown in FIG. 6a. A torsionally resilient tensile element 48 is arranged, fully traversing the interior of the carrier 4. The rotor blade holder 2 is connected non-positively via the integrated internal torsionally resilient tensile element 48 to the torque transmission unit 1 and/or the rotor blade star 1 and by means of bolts or other suitable connecting elements, in order to forward the centrifugal force of the rotor blade 103 directly into the torque transmission unit 1. The rotor blade holder 2 is connected fixedly in terms of rotation to the torque tube 4. The centrifugal force of the rotor blade 103 is forwarded, via the torsionally resilient tensile element 48 which is attached in the interior of the carrier 4, from the rotor blade holder 2 directly into the rotor hub. Thus the rotor blade coupling device 9 is able to receive even greater centrifugal forces.

Figure 6B:
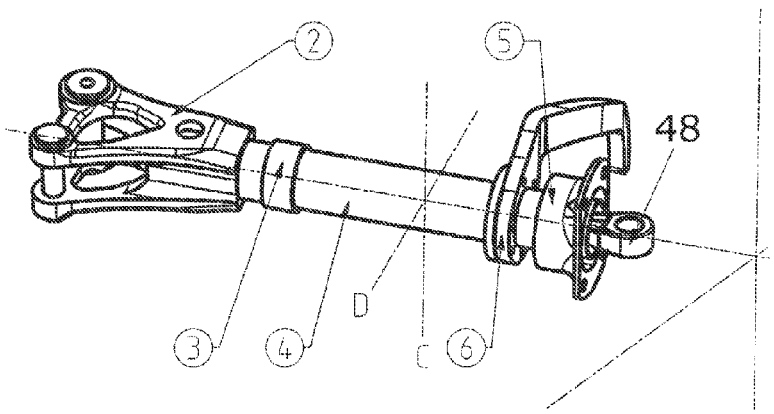
FIG. 6b shows a perspective view of a modified rotor blade holder with a rigid carrier and additional tensile element and FIG. 6c shows a section through the modified rotor blade holder with the additional tensile element.
Figure 6C:
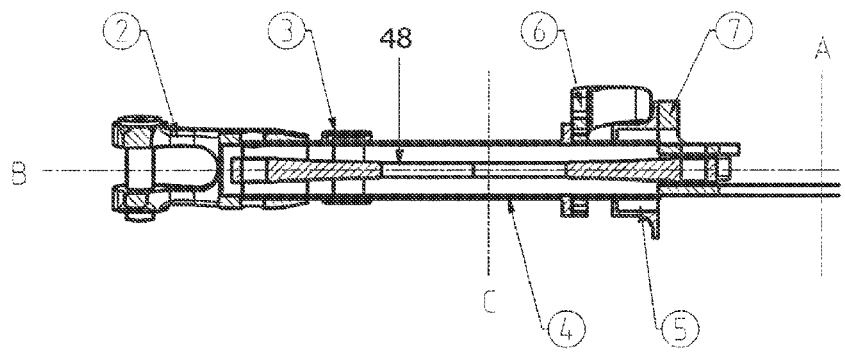

In the section of FIG. 6b, the torsionally resilient tensile element 48 fully traversing the hollow loop-like carrier 4 may be seen running between the thrust bearing 3 and the control bearing 5.

LIST OF REFERENCE NUMERALS

0 Rotor head
  100 Rotor mast
  A Rotor axis
  103 Rotor blade
  R Rotor blade longitudinal axis
  1 Torque transmission unit
  101 Rotor head star
  102 Rotor head central piece
  10 Tapered region
  11 Loop-like region
2 Rotor blade holder
3 Thrust bearing (spherical)
  30 Transmission element receiving portion
  31 Flexible portion
  32 Fastening portion
4 Carrier
  40 Flange on rotor axis side
  48 Tensile element
  B Carrier longitudinal axis
5 Control bearing (spherical)
6 Control arm (collective blade adjustment)
7 Bearing housing
8 Flange on blade holder side
9 Rotor blade coupling device
C Impact direction
D Pivoting direction

The invention claimed is:

1. A rotor blade coupling device (9) comprising a carrier (4) and a rotor blade holder (2) fastened thereto for receiving at least one rotor blade (103), wherein the carrier (4) is torsionally rigid and is mounted to be able to be resiliently deflected in a manner which is free of centrifugal force between a thrust bearing (3) and a control bearing (5) in the pivoting and impact directions, centrifugal forces being able to be transmitted by the rotor blade coupling device (9) to a torque transmission unit (1) and the entire rotor blade coupling device (9) being pivotably mounted without torsion about a carrier longitudinal axis (B) and wherein the carrier (4) is connected to the rotor blade holder (2) and the thrust bearing (3) via a flange on the blade holder side (8).

2. The rotor blade coupling device (9) according to claim 1, wherein the thrust bearing (3) and the control bearing (5) are configured as spherical bearings.

3. The rotor blade coupling device (9) according to claim 2, the thrust bearing (3) comprising a transmission element receiving portion (30), a flexible portion (31) and a fastening portion (32).

4. The rotor blade coupling device (9) according to claim 3, the flexible portion (31) comprising a plurality of alternating elastomeric layers and metal layers.

5. The rotor blade coupling device (9) according to claim 1, wherein the carrier (4) is mounted by an axial interference fit in the control bearing (5), in a flexible manner in the pivoting and impact directions.

6. The rotor blade coupling device (9) according to claim 1, wherein the control bearing (5) of the carrier (4) is fastened by means of a bearing housing (7) to the torque transmission unit (1).

7. The rotor blade coupling device (9) according to claim 6, wherein the rotor blade holder (2) transmits centrifugal forces via the thrust bearing (3) to the torque transmission unit (1) of a rotor head (0).

8. The rotor blade coupling device (9) according to claim 6, wherein the rotor blade coupling device (9) runs between a rotor head star (101) and a rotor head central piece (102) of the torque transmission unit (1).

9. The rotor blade coupling device (9) according to claim 8, wherein the thrust bearing (3) cooperates with a tapered region (10) of the rotor head star (101).

10. The rotor blade coupling device (9) according to claim 1, wherein the carrier (4) is configured to be tubular and torsionally rigid and is designed to be resilient in the impact direction (C) and the pivoting direction (D).

11. The rotor blade coupling device (9) according to claim 1, wherein a tensile element (48) is arranged running between the thrust bearing (3) and the control bearing (5) and fully traversing the carrier (4) of loop-like configuration.

* * * * *